(12) United States Patent
Wang (10) Patent No.: US 12,225,546 B2
(45) Date of Patent: Feb. 11, 2025

(54) FEEDBACK METHOD AND APPARATUS, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 323 days.

(21) Appl. No.: 17/839,969

(22) Filed: Jun. 14, 2022

(65) Prior Publication Data
US 2022/0346069 A1   Oct. 27, 2022

Related U.S. Application Data

(63) Continuation of application No. PCT/CN2020/075045, filed on Feb. 13, 2020.

(51) Int. Cl.
*H04W 72/23* (2023.01)
*H04L 5/00* (2006.01)

(52) U.S. Cl.
CPC .......... *H04W 72/23* (2023.01); *H04L 5/0055* (2013.01)

(58) Field of Classification Search
CPC ............................ H04W 72/23; H04L 5/0055
See application file for complete search history.

(56) References Cited

U.S. PATENT DOCUMENTS

| | | | |
|---|---|---|---|
| 2019/0124558 A1 | 4/2019 | Ang et al. | |
| 2020/0092814 A1* | 3/2020 | Zhou | H04W 52/0235 |
| 2021/0368447 A1* | 11/2021 | Kim | H04L 5/001 |
| 2023/0171688 A1* | 6/2023 | Xu | H04W 52/0206 |
| | | | 370/311 |

FOREIGN PATENT DOCUMENTS

| | | |
|---|---|---|
| CN | 107210871 A | 9/2017 |
| CN | 109274470 A | 1/2019 |
| CN | 105940651 B | 8/2019 |

(Continued)

OTHER PUBLICATIONS

International Search Report and Written Opinion dated Nov. 10, 2020 in International Application No. PCT/CN2020/075045. English translation attached.

(Continued)

*Primary Examiner* — Brenda H Pham
(74) *Attorney, Agent, or Firm* — Sheppard, Mullin, Richter & Hampton LLP (57) ABSTRACT

The embodiments of the present disclosure provide a feedback method and apparatus, a terminal device, and a network device. The method includes: receiving, by a terminal device, Downlink Control Information (DCI) transmitted by a network device, the DCI carrying first indication information indicating a state of at least one group of secondary cells (Scells) or at least one Scell; and transmitting, by the terminal device, second indication information to the network device, the second indication information indicating that the terminal device acknowledges receipt of the first indication information.

18 Claims, 4 Drawing Sheets

(56) References Cited

FOREIGN PATENT DOCUMENTS

| CN | 105917607 B | 11/2019 |
|---|---|---|
| CN | 106105087 B | 12/2019 |

OTHER PUBLICATIONS

Intel Corporation, "Remaining Details of SS/PBCH Block", 3GPP TSG RAN WG1 Meeting 91, R1-1720057, Dec. 1, 2017 (Dec. 1, 2017), section 2.

Interdigital, Inc. "Remaining Issues on CA", 3GPP TSG RAN WG1 Meeting AH 1801, R1-1800604, Jan. 26, 2018 (Jan. 26, 2018), section 2.

Nokia et al. "Efficient CA design", 3GPP TSG RAN WG1 Meeting RAN1#96bis, R1-1904722, Apr. 12, 2019 (Apr. 12, 2019), whole document.

Communication pursuant to Article 94(3) EPC for European Application 20919082.6 dated Jun. 15, 2023.

Extended European Search Report dated Sep. 29, 2022 received in European Patent Application No. EP 20919082.6.

Mediatek Inc: "Efficient and low latency SCell data transmission for NR CA",3GPP Draft; RI-1912101, 3rd Generation Partnership Project (3GPP), Mobile Competence Centre ; 650, Route Des Lucioles ; F-06921 Sophia-Antipolis Cedex ; France vol. RAN WG1, No. Reno, U.S.A.; Nov. 18, 2019-Nov. 22, 2019, Nov. 9, 2019 (Nov. 9, 2019), XP051823194.

LG Electronics: "Discussion on L1 based Scell dormancy", 3GPP Draft; RI-1912407, 3rd Generation Partnership Project (3GPP), Mobile Competence Centre ; 650, Route Des Lucioles ; F-06921 Sophia-Ant Ipolis Cedex F-06921 Sophia-Ant Ipolis Cedex; France vol. RAN WG1, No. Reno, USA; Nov. 18, 2019-Nov. 22, 2019 Nov. 9, 2019 (Nov. 9, 2019), XP051823411.

Examination report dated Nov. 16, 2023 received in European Patent Application No. EP 20919082.6.

The First Office Action from corresponding Chinese Application No. 202211586660.3 mailed on Jun. 13, 2024.

MediaTek Inc., "Efficient and low latency SCell data transmission for NR CA", 3GPP TSG RAN WG1 Meeting RAN1 #99, R1-1912101, Agenda item: 7.2.13.3, section 1-4, Nov. 22, 2019.

LG Electronics, "Discussion on L1 based Scell dormancy", R1-1912407, 3GPP TSG RAN WG1 Meeting #99, Agenda Item: 7.2.13.3, section 1-3, Nov. 9, 2019.

Interdigital, Inc., "SCell activation/deactivation in NR", 3GPP TSG RAN WG1 Meeting 91, R1-1720557, Agenda item: 7.3.4.2, section 1-2, Nov. 18, 2017.

* cited by examiner

Receiving, by a terminal device, DCI transmitted by a network device, the DCI carrying first indication information indicating a state of at least one group of Scells or at least one Scell. /401

Transmitting, by the terminal device, second indication information to the network device, the second indication information indicating that the terminal device acknowledges receipt of the first indication information. /402

FEEDBACK METHOD AND APPARATUS, TERMINAL DEVICE, AND NETWORK DEVICE

CROSS-REFERENCE TO RELATED APPLICATIONS

The present application is a continuation of International Application No. PCT/CN2020/075045 filed on Feb. 13, 2020, which is incorporated herein by reference in its entirety.

TECHNICAL FIELD

The embodiments of the present disclosure relate to mobile communication technology, and more particularly, to a feedback method and apparatus, a terminal device, and a network device.

BACKGROUND

In the New Radio (NR) system, in order to achieve rapid recovery of a Secondary Cell (Scell), it is desired to support transmitting an activation-deactivation command via Downlink Control Information (DCI), or transmitting a dormancy-non-dormancy switching command via DCI. However, a Physical Downlink Control Channel (PDCCH) has no feedback mechanism. If the network side issues the above command but the terminal device does not receive the command, the network side does not know whether the terminal device has received the DCI carrying the command, resulting in a low reliability.

SUMMARY

The embodiments of the present disclosure provide a feedback method and apparatus, a terminal device, and a network device.

According to an embodiment of the present disclosure, a feedback method is provided. The method includes: receiving, by a terminal device, DCI transmitted by a network device, the DCI carrying first indication information indicating a state of at least one group of Scells or at least one Scell; and transmitting, by the terminal device, second indication information to the network device, the second indication information indicating that the terminal device acknowledges receipt of the first indication information.

According to an embodiment of the present disclosure, a feedback method is provided. The method includes: transmitting, by a network device, DCI to a terminal device, the DCI carrying first indication information indicating a state of at least one group of Scells or at least one Scell; and receiving, by the network device, second indication information transmitted by the terminal device, the second indication information indicating that the terminal device acknowledges receipt of the first indication information.

According to an embodiment of the present disclosure, a feedback apparatus is provided. The apparatus includes: a receiving unit configured to receive DCI transmitted by a network device, the DCI carrying first indication information indicating a state of at least one group of Scells or at least one Scell; and a transmitting unit configured to transmit second indication information to the network device, the second indication information indicating that the terminal device acknowledges receipt of the first indication information.

According to an embodiment of the present disclosure, a feedback apparatus is provided. The apparatus includes: a transmitting unit configured to transmit DCI to a terminal device, the DCI carrying first indication information indicating a state of at least one group of Scells or at least one Scell; and a receiving unit configured to receive second indication information transmitted by the terminal device, the second indication information indicating that the terminal device acknowledges receipt of the first indication information.

According to an embodiment of the present disclosure, a terminal device is provided. The terminal device includes a processor and a memory. The memory has a computer program stored thereon, and the processor is configured to invoke and execute the computer program stored in the memory to perform the above feedback method.

According to an embodiment of the present disclosure, a network device is provided. The network device includes a processor and a memory. The memory has a computer program stored thereon, and the processor is configured to invoke and execute the computer program stored in the memory to perform the above feedback method.

According to an embodiment of the present disclosure, a chip is provided. The chip is configured to perform the above feedback method. In particular, the chip includes a processor configured to invoke and execute a computer program from a memory, to cause a device provided with the chip to perform the above feedback method.

According to an embodiment of the present disclosure, a computer-readable storage medium is provided. The computer-readable storage medium has a computer program stored thereon. The computer program causes a computer to perform the above feedback method.

According to an embodiment of the present disclosure, a computer program product is provided. The computer program product includes computer program instructions that cause a computer to perform the above feedback method.

According to an embodiment of the present disclosure, a computer program is provided. The computer program, when executed on a computer, causes the computer to perform the above feedback method.

With the above solutions, the network device can indicate the state of at least one group of Scells or at least one Scell via the first indication information (or referred to as state management command) in the DCI, and the terminal device can feed back to the network device whether it has received the first indication information, such that the command from the network side can be executed efficiently and reliably.

BRIEF DESCRIPTION OF DRAWINGS

The figures described here are used to provide a further understanding of the present disclosure and constitute a part of the present disclosure. The exemplary embodiments of the present disclosure and description thereof are used to explain the present disclosure, and do not constitute an improper limitation of the present disclosure. In the figures:

FIG. 2-1 is a first schematic diagram showing a BWP according to an embodiment of the present disclosure;

FIG. 2-2 is a second schematic diagram showing a BWP according to an embodiment of the present disclosure;

FIG. 2-3 is a third schematic diagram showing a BWP according to an embodiment of the present disclosure;

FIG. 3-1 is a first schematic diagram showing a MAC CE according to an embodiment of the present disclosure;

FIG. 3-2 is a second schematic diagram showing a MAC CE according to an embodiment of the present disclosure;

DESCRIPTION OF EMBODIMENTS

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The technical solutions according to the embodiments of the present disclosure can be applied to various communication systems, including for example: a Long Term Evolution (LTE) system, a LTE Frequency Division Duplex (FDD) system, a LTE Time Division Duplex (TDD) system, the $5^{th}$ Generation (5G) communication system, or any future communication system.

Figure 1:
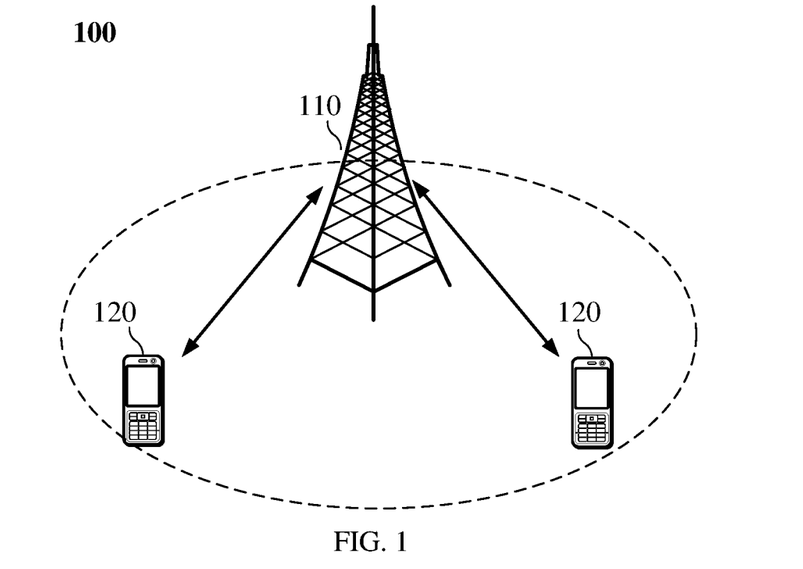
FIG. 1 is a schematic diagram showing a communication system architecture according to an embodiment of the present disclosure.

A communication system 100 where an embodiment of the present disclosure can be applied is shown in FIG. 1. The communication system 100 may include a network device 110. The network device 110 may be a device that can communicate with terminals (or referred to as communication terminals or terminals) 120. The network device 110 may provide communication coverage for a particular geographic area, and may communicate with terminals located in the coverage area. Optionally, the network device 110 may be a base station such as Evolutional Node B (eNB or eNodeB) in an LTE system, or a radio controller in a Cloud Radio Access Network (CRAN). Alternatively, the network device 110 may be a mobile switch center, a relay station, an access point, a vehicle-mounted device, a wearable device, a hub, a switch, a network bridge, a router, a network side device in a 5G network, or a network device in a future communication system.

The communication system 100 further includes at least one terminal 120 located within the coverage of the network device 110. As used herein, the term "terminal" may include, but not limited to, an apparatus connected via a wired line, e.g., via a Public Switched Telephone Network (PSTN), a Digital Subscriber Line (DSL), a digital cable, or a direct cable connection, and/or via another data connection/network, and/or via a wireless interface, e.g., for a cellular network, a Wireless Local Area Network (WLAN), a digital TV network such as a DVB-H network, a satellite network, an AM-FM broadcast transmitter, and/or of another terminal, and configured to receive/transmit communication signals, and/or an Internet of Things (IoT) device. A terminal configured to communicate via a wireless interface may be referred to as a "wireless communication terminal", a "wireless terminal", or a "mobile terminal". Examples of the mobile terminal may include, but not limited to, a satellite or cellular phone, a Personal Communications System (PCS) terminal combining cellular radio phone with data processing, fax, and data communication capabilities, a PDA including a radio phone, a pager, Internet/intranet access, a Web browser, a memo pad, a calendar, and/or a Global Positioning System (GPS) receiver, or a conventional laptop and/or palmtop receiver or another electronic device including a radio telephone transceiver. The terminal may be an access terminal, a User Equipment (UE), a user unit, a user station, a mobile station, a mobile device, a remote station, a remote terminal, a mobile device, a user terminal, a terminal, a wireless communication device, a user agent, or a user apparatus. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal in a 5G network, or a terminal in a future evolved PLMN, etc.

Optionally, direct communication, such as Device to Device (D2D) communication, may be performed between the terminals 120.

Optionally, the 5G communication system or network may also be referred to as a New Radio (NR) system or network.

FIG. 1 exemplarily shows one network device and two terminals. Optionally, the communication system 100 may include a plurality of network devices and the coverage of each network device may include a different number of terminals. The embodiment of the present disclosure is not limited to this.

Optionally, the communication system 100 may also include other network entities such as a network controller and a mobility management entity, and the embodiment of the present disclosure is not limited to this.

It can be appreciated that, in the embodiment of the present disclosure, a device with a communication function in a network/system may be referred to as a communication device. For the communication system 100 shown in FIG. 1 as an example, communication devices may include the network device 110 and the terminals 120, each having a communication function. The network device 110 and the terminals 120 may be e.g., any of the specific devices described above, and details thereof will be omitted here. The communication device may also include other devices in the communication system 100, such as a network controller, a mobility management entity, and other network entities, and the embodiment of the present disclosure is not limited to this.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In order to facilitate understanding of the technical solutions of the embodiments of the present disclosure, the technical solutions related to the embodiments of the present disclosure will be described below.

With the pursuit of speed, delay, high mobility, and energy efficiency, and due to the diversity and complexity of services in future life, the $3^{rd}$ Generation Partnership Project (3GPP) international standard organization began to develop 5G. The main application scenarios of 5G include: enhanced Mobile Broadband (eMBB), Ultra-Reliable Low-Latency Communications (URLLC), and massive Machine-Type Communications (mMTC).

On one hand, eMBB still aims at users' access to multimedia content, services, and data, and its demand is growing rapidly. On the other hand, since eMBB may be deployed in different scenarios, such as indoor, urban, rural, etc., its capabilities and requirements are quite different, and it cannot be generalized and must be analyzed in detail in combination with specific deployment scenarios. Typical applications of URLLC include: industrial automation, power automation, telemedicine operation (surgery), traffic safety assurance, etc. Typical features of mMTC include: high connection density, small data volume, latency-insensitive services, and low cost and long service life of modules.

In the early deployment of NR, it is difficult to obtain a complete NR coverage, so a typical network coverage mode is a wide-area LTE coverage plus island NR coverage. LTE is deployed mostly in sub-6 GHz, and there is very limited sub-6 GHz spectrum available for the 5G. Therefore, NR has to study the spectrum application above 6 GHz, but the high frequency band has limited coverage and fast signal fading. At the same time, in order to protect the early investment of mobile operators in LTE, an operation mode of tight interworking between LTE and NR is proposed.

Figure 21:
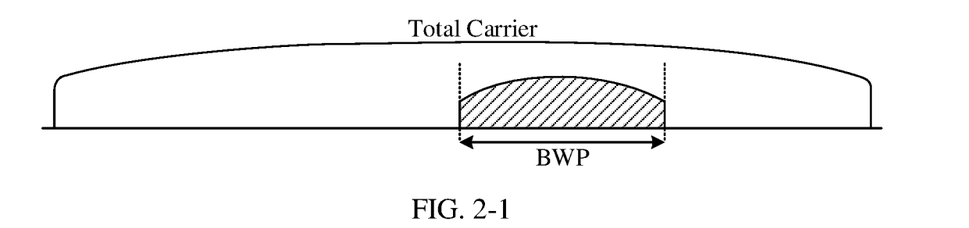
Figure 22:
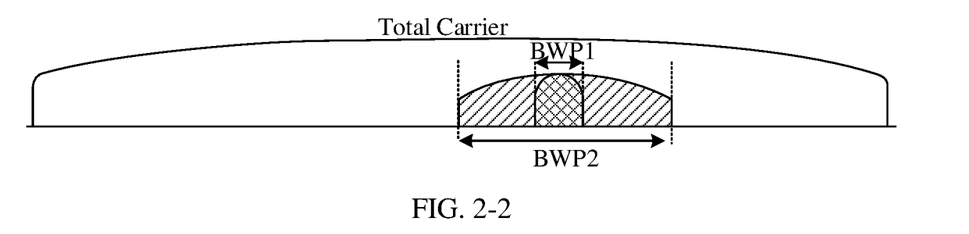
Figure 23:
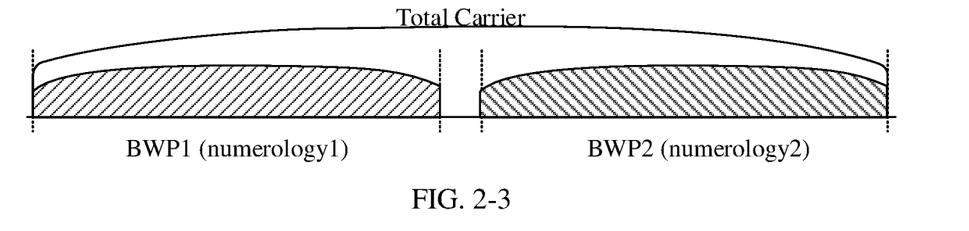

In the 5G, the maximum channel bandwidth can be 400 MHZ (referred to as wideband carrier), which is very large when compared to LTE's maximum bandwidth of 20M. If a terminal device keeps operating on the wideband carrier, the power consumption of the terminal device will be very high. Therefore, it is suggested that the Radio Frequency (RF) bandwidth of the terminal device can be adjusted according to the actual throughput of the terminal device. To this end, the concept of BWP is introduced, and the motivation of BWP is to optimize the power consumption of terminal device. For example, if the rate of the terminal device is very low, a small BWP can be configured for the terminal device (as shown in FIG. 2-1). If the required rate of the terminal device is very high, a larger BWP can be configured for the terminal device (as shown in FIG. 2-2). If the terminal device supports high rates or operates in the Carrier Aggregation (CA) mode, multiple BWPs can be configured for the terminal device (as shown in FIG. 2-3). Another purpose of the BWP is to trigger the coexistence of multiple numerologies in one cell. As shown in FIG. 2-3, BWP1 corresponds to numerology1, and BWP2 corresponds to numerology2.

One terminal can be configured with up to 4 uplink BWPs and up to 4 downlink BWPs via dedicated Radio Resource Control (RRC) signaling, but only one uplink BWP and downlink BWP can be active at a time. In the dedicated RRC signaling, the first active BWP among the configured BWPs may be indicated. Meanwhile, when the terminal is in the connected state, it can also switch between different BWPs via Downlink Control Information (DCI). When the carrier in the inactive state enters the active state, the first active BWP is the first active BWP configured in the dedicated RRC signaling. Configuration parameters for each BWP include:

subcarrier spacing (subcarrierSpacing);
    cyclic prefix (cyclicPrefix);
    the first Physical Resource Block (PRB) of the BWP and the number of consecutive PRBs (locationAndBandwidth);
    BWP identifier (bwp-Id);
    BWP common configuration parameters and dedicated configuration parameters (bwp-Common, bwp-Dedicated).

A terminal performs Radio Link Monitor (RLM) on the active BWP only, not on the inactive BWP(s). When the terminal switches between different BWPs, the RLM related timers and counters do not need to be reset. RRM measurement will not be affected no matter on which active BWP the terminal transmits and receives data. The terminal also only needs to perform CQI measurement on the active BWP.

When a carrier is deactivated and then activated via a Media Access Control (MAC) Control Element (CE), initially the first active BWP is the first active BWP configured in the dedicated RRC signaling.

The value of the BWP identifier (BWP id) in the dedicated RRC signaling ranges from 0 to 4. The BWP with the BWP identifier of 0 is by default the initial BWP.

The BWP indicator in the DCI has 2 bits, as shown in Table 1 below. If the number of configured BWPs is smaller than or equal to 3, the BWP indicator=1, 2, and 3, corresponding to BWP id=1, 2, and 3, respectively. If the number of BWPs is 4, the BWP indicator=0, 1, 2, and 3, corresponding to the BWPs configured according to the sequential indices, respectively. Moreover, the network side uses continuous BWP ids when configuring the BWPs.

TABLE 1

| Value of BWP indicator (2 bits) | BWP |
|---|---|
| 00 | First BWP configured by higher-layer |
| 01 | Second BWP configured by higher-layer |
| 10 | Third BWP configured by higher-layer |
| 11 | Fourth BWP configured by higher-layer |

In order to meet the requirements of high rates, the CA technology is also supported in the 5G. CA enables the NR system to support a larger bandwidth by jointly scheduling and using resources on multiple Component Carriers (CCs), thereby enabling a higher system peak rate. According to the continuity of the aggregated carriers in the spectrum, CA can be divided into continuous CA and non-continuous CA. According to whether the aggregated carriers are in the same band, CA can be divided into intra-band CA and inter-band CA.

In CA, there is one and only one Primary Cell Component (PCC), which provides RRC signaling connection, Non-Access Stratum (NAS) function, security function, etc. The Physical Uplink Control Channel (PUCCH) exists on the PCC and only on the PCC. A Secondary Cell Component (SCC) only provides additional radio resources. The PCC and the SCC are both called serving cells, with the cell on the PCC being a Primary cell (Pcell) and the cell on the SCC being an Scell. It is also specified in the standard that up to 5 aggregated carriers can be supported, i.e., the maximum bandwidth after aggregation is 100 MHZ, and the aggregated carriers belong to the same base station. All aggregated carriers use the same Cell-Radio Network Temporary Identifier (C-RNTI), and the base station ensures that the C-RNTIs do not collide in the cell where each carrier is located. Since both asymmetric carrier aggregation and symmetric carrier aggregation are supported, it is required that the aggregated carrier must have downlink and may not have uplink. Moreover, for the PCC cell, there must be PDCCH and PUCCH of the cell, and only the primary carrier cell has PUCCH, and other secondary carrier cells may have PDCCH.

The Scell is configured via dedicated RRC signaling, and the initially configured state is an inactive state, in which data transmission and reception cannot be performed. Then, the Scell can be activated via a MAC CE to perform data transmission and reception. From the perspective of delay of S cell configuration and activation, this architecture may not be an optimal architecture. The delay reduces the efficiency of CA usage and radio resources, especially in small cell deployment scenarios. In a dense small cell deployment scenario, the signaling overhead for each Scell is also relatively high, especially when each Scell needs to be configured separately. Therefore, the current CA architecture introduces an additional delay, which limits the use of CA and reduces the gain of CA load sharing.

Figure 31:
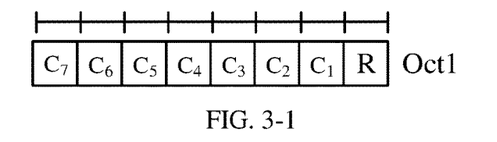
Figure 32:
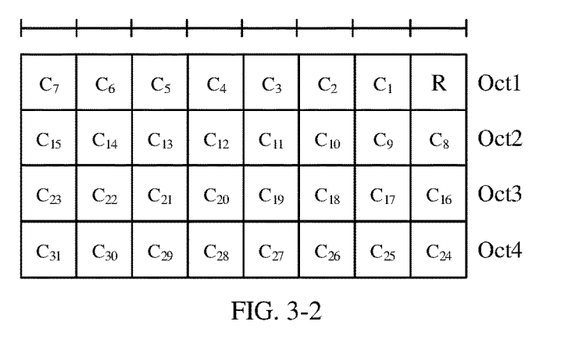

To this end, CA is optimized in LTE R15, including the following main optimizations. 1) The state of Scell is divided into an active state and an inactive state. In order to achieve fast cell recovery, a new cell state, i.e., dormant state, is defined. In the dormant state, the terminal measures and reports CQI/RRM, but does not decode PDCCH. Also, a new MAC CE is defined to control the transition between the active state and the dormant state, as shown in FIG. 3-1 and FIG. 3-2. In FIG. 3-1, the MAC CE includes 1 octet and controls the state transitions of 7 cells. In FIG. 3-2, the MAC CE includes 4 octets and controls the state transitions of 31 cells. Here, $C_i$ represents the state corresponding to the cell with the index i, and if $C_i$ is set to 1, the cell with the index i is in a dormant state, and if $C_i$ is set to 0, the cell with the index i is in an active state. 2) In the RRC signaling, the state of the Scell can be configured to be an active state or a dormant state, with the default state being an inactive state.

In order for the Scell to quickly recover and transmit data as soon as possible, a mechanism similar to the dormant state needs to be introduced. However, the mechanism of the dormant state in LTE is too complicated, and the MAC CE needs to be introduced to perform state transition of the Scell. To this end, a concept called dormant BWP may be configured for the Scell. When the traffic volume is not high, the BWPs of some Scells can be switched to the dormant BWP using DCI. When the traffic volume is relatively high, the traffic transmission function of the cell can be activated by switching the dormant BWP of the Scell to the non-dormant BWP using DCI, which leads to a lower activation delay and a lower complexity than the traditional activation of the Scell from the dormant state.

In NR, the state of the Scell can be directly configured as the active state via RRC. Here, the active state has a dormancy behavior and a non-dormancy behavior. That is, the dormancy behavior is a part of the active state.

In the NR R16 CA/DC enhancement topic, the Scells can be grouped, and the network can instruct a group of Scells to enter an active state with a dormancy behavior or an active state with a non-dormancy behavior via DCI commands according to Scell grouping. At the same time, in the R16 CA/DC enhancement topic, the Scell grouping may be different depending on whether the DCI is transmitted to the terminal device in DRX active time or DRX inactive time. Therefore, the network side will configure two Scell grouping configurations.

In this case, when the terminal device receives DCI from the network, the DCI instructs all Scells in a group of Scells to enter an active state with a non-dormancy behavior (referred to as non-dormancy behavior) from an active state with a dormancy behavior (referred to as dormancy behavior), the network side configures a BWP (referred to as first active BWP) as the active BWP when the terminal device enters the non-dormancy behavior. DCI has two application scenarios, one is when a dormancy/non-dormancy indication is received from DCI corresponding to a Wake Up Signal (WUS), and the other is when a dormancy/non-dormancy indication is received from normal DCI. The first active BWP in the two scenarios may be configured as different BWPs.

In R17, in order to accelerate the activation of the Scell, it is desired to support transmission of an activation-deactivation command for the Scell via DCI, and the command may also be used for activation and deactivation in Scell groups. Since a PDCCH carries the dormancy-non-dormancy switching command for at least one Scell or at least one group of Scells, or the activation-deactivation command for at least one Scell or at least one group of Scells, and the PDCCH has no feedback mechanism, if the network side issues the above command but the terminal device does not receive it, the network side does not know whether the terminal device has received the DCI carrying the above command. Moreover, the dormancy/non-dormancy indication (i.e. dormancy-non-dormancy switching command) carried in the DCI corresponding to the WUS and the dormancy/non-dormancy indication (i.e., dormancy-non-dormancy switching command) carried in the normal DCI may correspond to different Scell groups or the same Scell group. After a certain Scell of the terminal device enters the non-dormancy behavior, the active BWP may be different or the same in the above two types of DCI. To save signaling overhead, only one DCI configuration can be configured for the two scenarios. The technical solutions of the embodiments of the present disclosure will be described in detail below.

Figure 4:
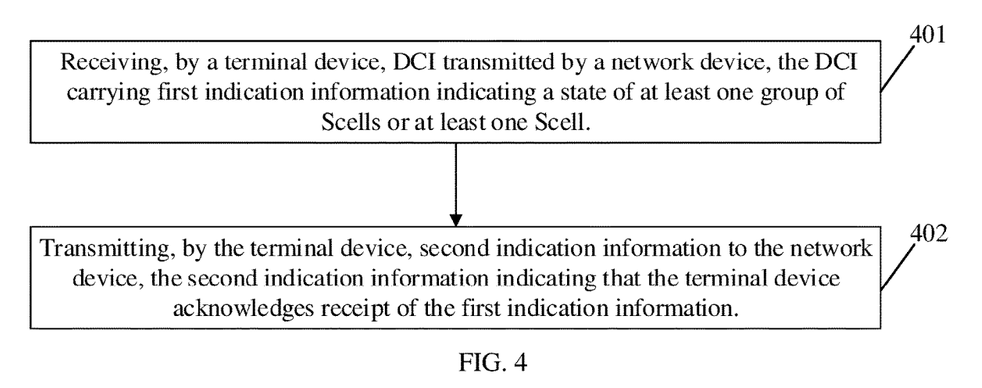
FIG. 4 is a schematic flowchart illustrating a feedback method according to an embodiment of the present disclosure.

FIG. 4 is a schematic flowchart illustrating a feedback method according to an embodiment of the present disclosure. As shown in FIG. 4, the feedback method includes the following steps.

At step 401, a terminal device receives DCI transmitted by a network device. The DCI carries first indication information indicating a state of at least one group of Scells or at least one Scell.

In an embodiment of the present disclosure, the network device transmits the DCI to the terminal device, and accordingly, the terminal device receives the DCI transmitted by the network device. Here, optionally, the network device may be a base station, such as a gNB.

In an embodiment of the present disclosure, the DCI carries the first indication information indicating the state of the at least one group of Scells or the at least one Scell. For example, the first indication information may indicate states of N1 groups of Scells, where N1 is a positive integer. For example, the first indication information may indicate states of N2 Scells, where N2 is a positive integer.

In an embodiment of the present disclosure, the state is a first state or a second state.

1) In an option, the first state may refer to an active state with a dormancy behavior (referred to as dormancy behavior for short), and the second state may refer to an active state with a non-dormancy behavior (referred to as non-dormancy behavior for short). In this option, the first indication information may be referred to as dormancy/non-dormancy indication information, or referred to as a dormancy-non-dormancy switching command.

2) In another option, the first state may refer to an active state, and the second state may refer to an inactive state (or referred to as a deactivated state). In this manner, the first indication information may be referred to as an activation-deactivation command.

In an option, the first indication information includes a first bitmap. Each bit in the first bitmap corresponds to one group of Scells or one Scell and has a value indicating whether the state of the group of Scells or the Scell corresponding to the bit is the first state or the second state.

For example, the first indication information carried by the DCI can be implemented by a 5-bit bitmap, and the 5 bits in the bitmap correspond to 5 groups of SCells or 5 SCells, respectively. Here, the grouping of the SCells can be configured via RRC signaling. The value of each bit being 1 or 0 indicates whether a group of SCells or an SCell corresponding to the bit enters the dormancy behavior or leaves the dormancy behavior (i.e., enters the non-dormancy behavior).

For example, the first indication information carried by the DCI can be implemented by a 5-bit bitmap, and the 5 bits in the bitmap correspond to 5 groups of SCells or 5 SCells, respectively. Here, the grouping of the SCells can be configured via RRC signaling. The value of each bit being 1 or 0 indicates whether a group of SCells or an SCell corresponding to the bit enters the active state or leaves the active state (i.e., enters the inactive state).

At step 402, the terminal device transmits second indication information to the network device. The second indication information indicates that the terminal device acknowledges receipt of the first indication information.

In an embodiment of the present disclosure, the terminal device transmits the second indication information to the network device, and accordingly, the network device receives the second indication information transmitted by the terminal device.

In an embodiment of the present disclosure, the second indication information may be carried in a MAC CE, a PUCCH, or a Physical Uplink Shared Channel (PUSCH).

In an embodiment of the present disclosure, the second indication information indicates that the terminal device acknowledges receipt of the first indication information. Optionally, the second indication information may indicate at least one of:

the terminal device having successfully received the first indication information;
time at which the first indication information is received by the terminal device;
index information of a BWP in which the first indication information is received by the terminal device; or
index information of a search space in which the first indication information is received by the terminal device.

Here, the time at which the first indication information is received by the terminal device may include at least one of:

an SFN number of a PDCCH or the DCI corresponding to the first indication information received by the terminal device;
a subframe number of the PDCCH or the DCI corresponding to the first indication information received by the terminal device;
a slot number of the PDCCH or the DCI corresponding to the first indication information received by the terminal device; or
a symbol number of the PDCCH or the DCI corresponding to the first indication information received by the terminal device.

In the above solution, the PDCCH or DCI corresponding to the first indication information refers to the PDCCH or DCI carrying the first indication information.

In an embodiment of the present disclosure, the terminal device may transmit the second indication information to the network device by:

1) transmitting the second indication information in a first PUCCH after receiving the first indication information;
2) transmitting the second indication information in a first PUSCH after receiving the first indication information; or
3) transmitting the second indication information in a scheduling grant of a first PUSCH after receiving the first indication information.

In an option, the network device may start a timer after the first indication information, and if the timer expires, the network device considers that the terminal device has not successfully received the first indication information. Further, optionally, the network device may cancel transmission of the first indication information.

Here, the time length of the timer may be specified in the protocol or configured by the network side.

In an embodiment of the present disclosure, the DCI received by the terminal device may be DCI in a first format or DCI in a second format. The DCI in the first format corresponds to an application scenario, and the DCI in the second format corresponds to another application scenario. Specifically, the DCI in the first format may refers to DCI corresponding to a WUS (i.e., DCI used to implement the WUS), and the DCI in the second format may refer to the DCI not corresponding to a WUS (i.e., a normal DCI). For the above two different formats of DCI, their associated configurations may be different or the same, and detailed description thereof will be given below.

The network device transmits first configuration information to the terminal device, and the terminal device receives the first configuration information transmitted by the network device. The first configuration information is used to determine an Scell grouping configuration corresponding to the DCI in the first format and/or an Scell grouping configuration corresponding to the DCI in the second format.

For example, the SCell grouping configuration is shown in Table 2 below:

TABLE 2

| DormancyCellGroups::= | | SEQUENCE { |
| withinActiveTimeToAddModList | | SEQUENCE (SIZE (1..maxNrofDormancyGroups)) OF |
| DormancyGroup-r16 | OPTIONAL, | -- Need N |
| withinActiveTimeToReleaseList | | SEQUENCE (SIZE (1..maxNrofDormancyGroups)) OF |

TABLE 2-continued

| | | |
|---|---|---|
| DormancyGroupID-r16 | OPTIONAL, | -- Need N |
| outsideActiveTimeToAddModList | | SEQUENCE (SIZE (1..maxNrofDormancyGroups)) OF |
| DormancyGroup-r16 | OPTIONAL, | -- Cond DormancyWUS |
| outsideActiveTimeToReleaseList | | SEQUENCE (SIZE (1..maxNrofDormancyGroups)) OF |
| DormancyGroupID-r1 | OPTIONAL | -- Need N |
| } | | |

A1) When the Scell grouping configuration corresponding to the DCI in the first format is not configured in the first configuration information, the Scell grouping configuration corresponding to the DCI in the first format is same as the Scell grouping configuration corresponding to the DCI in the second format. Alternatively, when the Scell grouping configuration corresponding to the DCI in the second format is not configured in the first configuration information, the Scell grouping configuration corresponding to the DCI in the second format is same as the Scell grouping configuration corresponding to the DCI in the first format.

Referring to Table 2, if outsideActiveTimeToAddModList or withinActiveTimeToAddModList is not configured, the configurations of outsideActiveTimeToAddModList and withinActiveTimeToAddModList are by default the same. Here, outsideActiveTimeToAddModList refers to the Scell grouping configuration corresponding to the DCI in the first format (i.e., the DCI corresponding to a WUS), and withinActiveTimeToAddModList refers to the Scell grouping configuration corresponding to the DCI in the second format (i.e., the DCI not corresponding to a WUS).

B1) When the Scell grouping configuration corresponding to the DCI in the first format is not configured in the first configuration information and a Wake-Up Signal (WUS) is configured, the Scell grouping configuration corresponding to the DCI in the first format is same as the Scell grouping configuration corresponding to the DCI in the second format. Alternatively, when the Scell grouping configuration corresponding to the DCI in the second format is not configured in the first configuration information and a WUS is configured, the Scell grouping configuration corresponding to the DCI in the second format is same as the Scell grouping configuration corresponding to the DCI in the first format.

Referring to Table 2, if outsideActiveTimeToAddModList or withinActiveTimeToAddModList is not configured and a WUS is configured, the configurations of outsideActiveTimeToAddModList and withinActiveTimeToAddModList are by default the same. Here, outsideActiveTimeToAddModList refers to the Scell grouping configuration corresponding to the DCI in the first format (i.e., the DCI corresponding to a WUS), and withinActiveTimeToAddModList refers to the Scell grouping configuration corresponding to the DCI in the second format (i.e., the DCI not corresponding to a WUS).

C1) The first configuration information carries third indication information, the third indication information indicating whether the Scell grouping configuration corresponding to the DCI in the first format is same as the Scell grouping configuration corresponding to the DCI in the second format.

Further, optionally, when the third indication information indicates that the Scell grouping configuration corresponding to the DCI in the first format is the same as the Scell grouping configuration corresponding to the DCI in the second format, the first configuration information may include one Scell grouping configuration used to determine the Scell grouping configuration corresponding to the DCI in the first format and the Scell grouping configuration corresponding to the DCI in the second format.

Further, optionally, when the first configuration information does not carry the third indication information, or the first configuration information carries the third indication information but the third indication information indicates that the Scell grouping configuration corresponding to the DCI in the first format is different from the SCell grouping configuration corresponding to the DCI in the second format, if the SCell grouping configuration for only one scenario is configured in the first configuration information, the SCell grouping configuration for the other scenario is considered to be not configured.

The network device transmits second configuration information to the terminal device, and the terminal device receives the second configuration information transmitted by the network device. The second configuration information is used to determine a first active BWP configuration corresponding to the DCI in the first format and/or a first active BWP configuration corresponding to the DCI in the second format.

Here, the first active BWP refers to an active BWP when the terminal device switches from a non-dormancy behavior to a dormancy behavior or from an inactive state to an active state. An example of the first active BWP configuration method is shown in Table 3 below:

TABLE 3

| | |
|---|---|
| firstWithinActiveTimeBWP-Id-r16 | BWP-Id |
| OPTIONAL, -- Cond MultipleNonDormantBWP | |
| firstOutsideActiveTimeBWP-Id-r16 | BWP-Id |
| OPTIONAL -- Cond MultipleNonDormantBWP-WUS | |

A2) When the first active BWP configuration corresponding to the DCI in the first format is not configured in the first configuration information, the first active BWP configuration corresponding to the DCI in the first format is same as the first active BWP configuration corresponding to the DCI in the second format. Alternatively, when the first active BWP configuration corresponding to the DCI in the second format is not configured in the first configuration information, the first active BWP configuration corresponding to the DCI in the second format is same as the first active BWP configuration corresponding to the DCI in the first format.

Referring to Table 3, if firstOutsideActiveTimeBWP-Id or firstWithinActiveTimeBWP-Id is not configured, the values of firstOutsideActiveTimeBWP-Id and firstWithinActiveTimeBWP-Id are by default the same. Here, firstOutsideActiveTimeBWP-Id refers to the first active BWP configuration corresponding to the DCI in the first format (i.e., the DCI corresponding to a WUS), and firstWithinActiveTimeBWP-Id refers to the first active BWP configuration corresponding to the DCI in the second format (i.e., the DCI not corresponding to a WUS).

B2) When the first active BWP configuration corresponding to the DCI in the first format is not configured in the first configuration information and a WUS is configured, the first active BWP configuration corresponding to the DCI in the first format is same as the first active BWP configuration corresponding to the DCI in the second format. Alternatively, when the first active BWP configuration corresponding to the DCI in the second format is not configured in the first configuration information and a WUS is configured, the first active BWP configuration corresponding to the DCI in the second format is same as the first active BWP configuration corresponding to the DCI in the first format.

Referring to Table 3, if firstOutsideActiveTimeBWP-Id or firstWithinActiveTimeBWP-Id is not configured and a WUS is configured, the values of firstOutsideActiveTimeBWP-Id and firstWithinActiveTimeBWP-Id are by default the same. Here, firstOutsideActiveTimeBWP-Id refers to the first active BWP configuration corresponding to the DCI in the first format (i.e., the DCI corresponding to a WUS), and firstWithinActiveTimeBWP-Id refers to the first active BWP configuration corresponding to the DCI in the second format (i.e., the DCI not corresponding to a WUS).

C2) The second configuration information carries fourth indication information, the fourth indication information indicating whether the first active BWP configuration corresponding to the DCI in the first format is same as the first active BWP configuration corresponding to the DCI in the second format.

Further, optionally, when the fourth indication information indicates that the first active BWP configuration corresponding to the DCI in the first format is the same as the first active BWP configuration corresponding to the DCI in the second format, the first configuration information may include one first active BWP configuration used to determine the first active BWP configuration corresponding to the DCI in the first format and the first active BWP configuration corresponding to the DCI in the second format.

Further, optionally, when the second configuration information does not carry the fourth indication information, or the second configuration information carries the fourth indication information but the fourth indication information indicates that the first active BWP configuration corresponding to the DCI in the first format is different from the first active BWP configuration corresponding to the DCI in the second format, if the first active BWP configuration for only one scenario is configured in the second configuration information, the first active BWP configuration for the other scenario is considered to be not configured.

Figure 5:
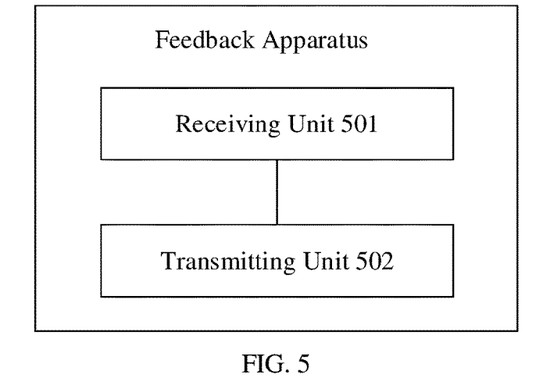
FIG. 5 is a first schematic diagram showing a structure of a feedback apparatus according to an embodiment of the present disclosure.

FIG. 5 is a first schematic diagram showing a structure of a feedback apparatus according to an embodiment of the present disclosure, which is applied in a terminal device. As shown in FIG. 5, the feedback apparatus includes:

a receiving unit 501, configured to receive DCI transmitted by a network device, the DCI carrying first indication information indicating a state of at least one group of Scells or at least one Scell; and a transmitting unit 502 configured to transmit second indication information to the network device, the second indication information indicating that the terminal device acknowledges receipt of the first indication information.

In an optional, the state may be a first state or a second state. The first state refers to an active state with dormancy behavior, and the second state refers to an active state with non-dormancy behavior; or the first state refers to an active state, and the second state refers to an inactive state.

In an option, the first indication information may include a first bitmap, each bit in the first bitmap corresponding to one group of Scells or one Scell and having a value indicating whether the state of the group of Scells or the Scell corresponding to the bit is the first state or the second state.

In an option, the second indication information may be carried in a MAC CE, a PUCCH, or a PUSCH.

In an option, the transmitting unit 502 may be configured to: transmit the second indication information in a first PUCCH after receiving the first indication information; transmit the second indication information in a first PUSCH after receiving the first indication information; or transmit the second indication information in a scheduling grant of a first PUSCH after receiving the first indication information.

In an option, the second indication information may further indicate at least one of: the terminal device having successfully received the first indication information; time at which the first indication information is received by the terminal device; index information of a BWP in which the first indication information is received by the terminal device; or index information of a search space in which the first indication information is received by the terminal device.

In an option, the time at which the first indication information is received by the terminal device may include at least one of: an SFN number of a PDCCH or the DCI corresponding to the first indication information received by the terminal device; a subframe number of the PDCCH or the DCI corresponding to the first indication information received by the terminal device; a slot number of the PDCCH or the DCI corresponding to the first indication information received by the terminal device; or a symbol number of the PDCCH or the DCI corresponding to the first indication information received by the terminal device.

In an option, the receiving unit 501 may be further configured to receive first configuration information transmitted by the network device, the first configuration information being used to determine an Scell grouping configuration corresponding to the DCI in a first format and/or an Scell grouping configuration corresponding to the DCI in a second format.

In an option, when the S cell grouping configuration corresponding to the DCI in the first format is not configured in the first configuration information, the Scell grouping configuration corresponding to the DCI in the first format may be same as the Scell grouping configuration corresponding to the DCI in the second format; or when the Scell grouping configuration corresponding to the DCI in the second format is not configured in the first configuration information, the Scell grouping configuration corresponding to the DCI in the second format may be same as the Scell grouping configuration corresponding to the DCI in the first format.

In an option, when the S cell grouping configuration corresponding to the DCI in the first format is not configured in the first configuration information and a WUS is configured, the Scell grouping configuration corresponding to the DCI in the first format may be same as the Scell grouping configuration corresponding to the DCI in the second format; or when the Scell grouping configuration corresponding to the DCI in the second format is not configured in the first configuration information and a WUS is configured, the Scell grouping configuration corresponding to the DCI in the second format may be same as the Scell grouping configuration corresponding to the DCI in the first format.

In an option, the first configuration information may carry third indication information, the third indication information indicating whether the Scell grouping configuration corresponding to the DCI in the first format is same as the Scell grouping configuration corresponding to the DCI in the second format.

In an option, when the third indication information indicates that the Scell grouping configuration corresponding to the DCI in the first format is the same as the Scell grouping configuration corresponding to the DCI in the second format, the first configuration information may include one Scell grouping configuration used to determine the Scell grouping configuration corresponding to the DCI in the first format and the Scell grouping configuration corresponding to the DCI in the second format.

In an option, the receiving unit 501 may be further configured to receive second configuration information transmitted by the network device, the second configuration information being used to determine a first active BWP configuration corresponding to the DCI in the first format and/or a first active BWP configuration corresponding to the DCI in the second format.

In an option, when the first active BWP configuration corresponding to the DCI in the first format is not configured in the first configuration information, the first active BWP configuration corresponding to the DCI in the first format may be same as the first active BWP configuration corresponding to the DCI in the second format; or when the first active BWP configuration corresponding to the DCI in the second format is not configured in the first configuration information, the first active BWP configuration corresponding to the DCI in the second format may be same as the first active BWP configuration corresponding to the DCI in the first format.

In an option, when the first active BWP configuration corresponding to the DCI in the first format is not configured in the first configuration information and a WUS is configured, the first active BWP configuration corresponding to the DCI in the first format may be same as the first active BWP configuration corresponding to the DCI in the second format; or when the first active BWP configuration corresponding to the DCI in the second format is not configured in the first configuration information and a WUS is configured, the first active BWP configuration corresponding to the DCI in the second format may be same as the first active BWP configuration corresponding to the DCI in the first format.

In an option, the second configuration information may carry fourth indication information, the fourth indication information indicating whether the first active BWP configuration corresponding to the DCI in the first format is same as the first active BWP configuration corresponding to the DCI in the second format.

In an option, when the fourth indication information indicates that the first active BWP configuration corresponding to the DCI in the first format is the same as the first active BWP configuration corresponding to the DCI in the second format, the first configuration information may include one first active BWP configuration used to determine the first active BWP configuration corresponding to the DCI in the first format and the first active BWP configuration corresponding to the DCI in the second format.

In an option, the DCI in the first format may refer to DCI corresponding to a WUS, and the DCI in the second format may refer to DCI not corresponding to a WUS.

It can be appreciated by those skilled in the art that, for the relevant description of the feedback apparatus according to the embodiment of the present disclosure, reference can be made to the relevant description of the feedback method according to the embodiment of the present disclosure.

Figure 6:
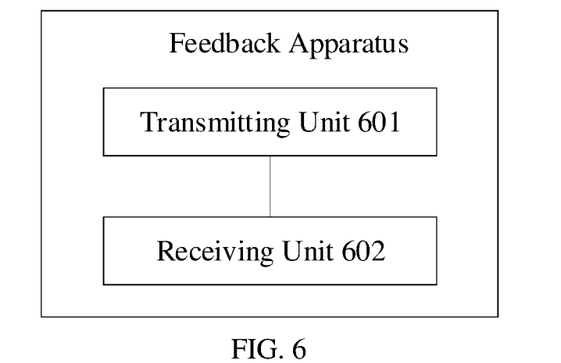
FIG. 6 is a second schematic diagram showing a structure of a feedback apparatus according to an embodiment of the present disclosure.

FIG. 6 is a second schematic diagram showing a structure of a feedback apparatus according to an embodiment of the present disclosure, which is applied in a network device. As shown in FIG. 6, the feedback apparatus includes:

a transmitting unit 601 configured to transmit DCI to a terminal device, the DCI carrying first indication information indicating a state of at least one group of Scells or at least one S cell; and a receiving unit 602 configured to receive second indication information transmitted by the terminal device, the second indication information indicating that the terminal device acknowledges receipt of the first indication information.

In an option, the state may be a first state or a second state. The first state refers to an active state with a dormancy behavior, and the second state refers to an active state with a non-dormancy behavior; or the first state refers to an active state, and the second state refers to an inactive state.

In an option, the first indication information includes a first bitmap, each bit in the first bitmap corresponding to one group of Scells or one Scell and having a value indicating whether the state of the group of Scells or the Scell corresponding to the bit is the first state or the second state.

In an option, the second indication information may be carried in a MAC CE, a PUCCH, or a PUSCH.

In an option, the second indication information may further indicate at least one of: the terminal device having successfully received the first indication information; time at which the first indication information is received by the terminal device; index information of a BWP in which the first indication information is received by the terminal device; or index information of a search space in which the first indication information is received by the terminal device.

In an option, the time at which the first indication information is received by the terminal device may include at least one of: an SFN number of a PDCCH or the DCI corresponding to the first indication information received by the terminal device; a subframe number of the PDCCH or the DCI corresponding to the first indication information received by the terminal device; a slot number of the PDCCH or the DCI corresponding to the first indication information received by the terminal device; or a symbol number of the PDCCH or the DCI corresponding to the first indication information received by the terminal device.

In an option, the transmitting unit 601 may be further configured to transmit first configuration information to the terminal device, the first configuration information being used to determine an Scell grouping configuration corresponding to the DCI in a first format and/or an Scell grouping configuration corresponding to the DCI in a second format.

In an option, when the S cell grouping configuration corresponding to the DCI in the first format is not configured in the first configuration information, the Scell grouping configuration corresponding to the DCI in the first format may be same as the Scell grouping configuration corresponding to the DCI in the second format; or when the Scell grouping configuration corresponding to the DCI in the second format is not configured in the first configuration information, the Scell grouping configuration corresponding to the DCI in the second format may be same as the Scell grouping configuration corresponding to the DCI in the first format.

In an option, when the S cell grouping configuration corresponding to the DCI in the first format is not configured in the first configuration information and a WUS is configured, the Scell grouping configuration corresponding to the DCI in the first format may be same as the Scell grouping configuration corresponding to the DCI in the second format; or when the Scell grouping configuration corresponding to the DCI in the second format is not configured in the first configuration information and a WUS is configured, the Scell grouping configuration corresponding to the DCI in the second format may be same as the Scell grouping configuration corresponding to the DCI in the first format.

In an option, the first configuration information may carry third indication information, the third indication information indicating whether the Scell grouping configuration corresponding to the DCI in the first format is same as the Scell grouping configuration corresponding to the DCI in the second format.

In an option, when the third indication information indicates that the Scell grouping configuration corresponding to the DCI in the first format is the same as the Scell grouping configuration corresponding to the DCI in the second format, the first configuration information may include one Scell grouping configuration used to determine the Scell grouping configuration corresponding to the DCI in the first format and the Scell grouping configuration corresponding to the DCI in the second format.

In an option, the transmitting unit 601 may be further configured to transmit second configuration information to the terminal device, the second configuration information being used to determine a first active BWP configuration corresponding to the DCI in the first format and/or a first active BWP configuration corresponding to the DCI in the second format.

In an option, when the first active BWP configuration corresponding to the DCI in the first format is not configured in the first configuration information, the first active BWP configuration corresponding to the DCI in the first format may be same as the first active BWP configuration corresponding to the DCI in the second format; or when the first active BWP configuration corresponding to the DCI in the second format is not configured in the first configuration information, the first active BWP configuration corresponding to the DCI in the second format may be same as the first active BWP configuration corresponding to the DCI in the first format.

In an option, when the first active BWP configuration corresponding to the DCI in the first format is not configured in the first configuration information and a WUS is configured, the first active BWP configuration corresponding to the DCI in the first format may be same as the first active BWP configuration corresponding to the DCI in the second format; or when the first active BWP configuration corresponding to the DCI in the second format is not configured in the first configuration information and a WUS is configured, the first active BWP configuration corresponding to the DCI in the second format may be same as the first active BWP configuration corresponding to the DCI in the first format.

In an option, the second configuration information may carry fourth indication information, the fourth indication information indicating whether the first active BWP configuration corresponding to the DCI in the first format is same as the first active BWP configuration corresponding to the DCI in the second format.

In an option, when the fourth indication information indicates that the first active BWP configuration corresponding to the DCI in the first format is the same as the first active BWP configuration corresponding to the DCI in the second format, the first configuration information may include one first active BWP configuration used to determine the first active BWP configuration corresponding to the DCI in the first format and the first active BWP configuration corresponding to the DCI in the second format.

In an option, the DCI in the first format may refer to DCI corresponding to a WUS, and the DCI in the second format may refer to DCI not corresponding to a WUS.

It can be appreciated by those skilled in the art that, for the relevant description of the feedback apparatus according to the embodiment of the present disclosure, reference can be made to the relevant description of the feedback method according to the embodiment of the present disclosure.

Figure 7:
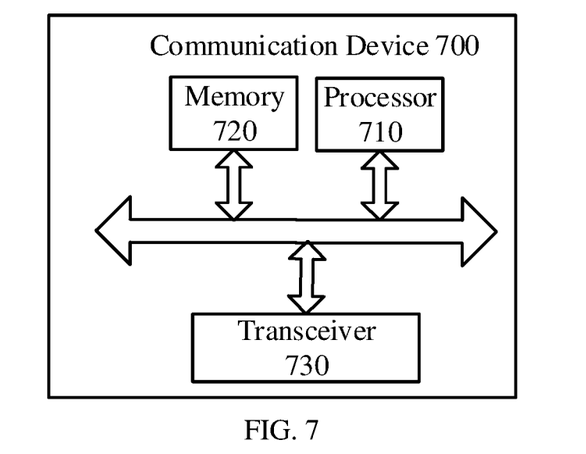
FIG. 7 is a schematic diagram showing a structure of a communication device according to an embodiment of the present disclosure.

FIG. 7 is a schematic diagram showing a structure of a communication device 700 according to an embodiment of the present disclosure. The communication device may be a terminal device or a network device. The communication device 700 shown in FIG. 7 includes a processor 710, and the processor 710 can invoke and execute a computer program from a memory to perform the method according to any of the embodiments of the present disclosure.

Optionally, as shown in FIG. 7, the communication device 700 may further include a memory 720. The processor 710 can invoke and execute a computer program from the memory 720 to perform the method according to any of the embodiments of the present disclosure.

The memory 720 may be a separate device independent of the processor 710, or may be integrated in the processor 710.

Optionally, as shown in FIG. 7, the communication device 700 may further include a transceiver 730. The processor 710 can control the transceiver 730 to communicate with other devices, and in particular to transmit information or data to other devices or receive information or data transmitted by other devices.

Here, the transceiver 730 may include a transmitter and a receiver. The transceiver 530 may further include one or more antennas.

Optionally, the communication device 700 may be the network device in the embodiment of the present disclosure, and the communication device 700 can perform corresponding procedures implemented by the network device in the method according to any of the embodiments of the present disclosure. Details thereof will be omitted here for simplicity.

Optionally, the communication device 700 may be the mobile terminal/terminal device in the embodiment of the present disclosure, and the communication device 700 can perform corresponding procedures implemented by the mobile terminal/terminal device in the method according to any of the embodiments of the present disclosure. Details thereof will be omitted here for simplicity.

Figure 8:
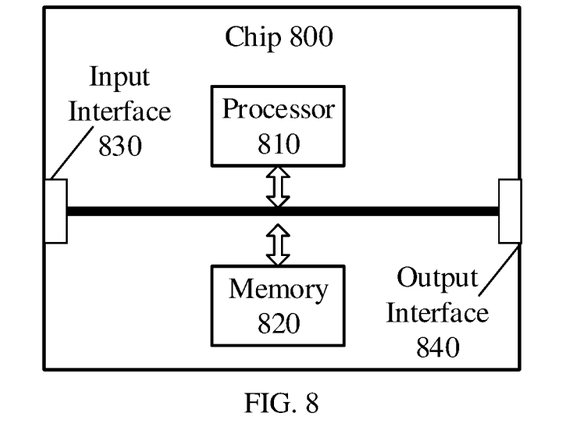
FIG. 8 is a schematic diagram showing a structure of a chip according to an embodiment of the present disclosure.

FIG. 8 is a schematic diagram showing a structure of a chip 800 according to an embodiment of the present disclosure. The chip 800 shown in FIG. 8 includes a processor 810, and the processor 810 can invoke and execute a computer program from a memory to implement the method in the embodiment of the present disclosure.

Optionally, as shown in FIG. 8, the chip 800 may further include a memory 820. The processor 810 can invoke and execute a computer program from the memory 820 to implement the method in the embodiment of the present disclosure.

The memory 820 may be a separate device independent from the processor 810, or may be integrated in the processor 810.

Optionally, the chip 800 may further include an input interface 830. The processor 810 can control the input interface 830 to communicate with other devices or chips, and in particular, obtain information or data transmitted by other devices or chips.

Optionally, the chip 800 may further include an output interface 840. The processor 810 can control the output interface 840 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the mobile terminal/terminal device in the embodiment of the present disclosure, and the chip can implement the corresponding process implemented by the mobile terminal/terminal device in each method of the embodiment of the present disclosure. For the sake of brevity, details thereof will be omitted here.

It can be appreciated that the chip in the embodiment of the present disclosure may be referred to as a system-level chip, a system-chip, a chip system, or a system-on-chip.

Figure 9:
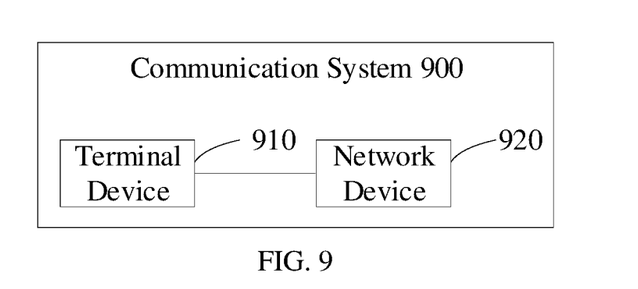
FIG. 9 is a schematic block diagram of a communication system according to an embodiment of the present disclosure.

FIG. 9 is a schematic block diagram of a communication system 900 according to an embodiment of the present disclosure. As shown in FIG. 9, the communication system 900 includes a terminal device 910 and a network device 920.

Here, the terminal device 910 can be configured to implement the corresponding functions implemented by the terminal device in the above method, and the network device 920 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as a random access memory, a flash memory, a read-only memory, a programmable read-only memory, an electrically erasable programmable memory, or a register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, apparatuses, and units described above, reference can be made to the corresponding processes in the foregoing method embodiments, and details thereof will be omitted here.

In the embodiments of the present disclosure, it can be appreciated that the disclosed systems, apparatuses, and methods may be implemented in other ways. For example, the apparatus embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between apparatuses or units via some interfaces, which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A feedback method, comprising:
   receiving, by a terminal device, Downlink Control Information (DCI) transmitted by a network device, the DCI carrying first indication information indicating a state of at least one group of secondary cells (Scells) or at least one Scell;
   transmitting, by the terminal device, second indication information to the network device, the second indication information indicating that the terminal device acknowledges receipt of the first indication information; and
   receiving, by the terminal device, second configuration information transmitted by the network device, the second configuration information being used to determine a first active BWP configuration corresponding to the DCI in the first format and a first active BWP configuration corresponding to the DCI in the second format.

2. The method according to claim 1, wherein the state is a first state or a second state;
   the first state is an active state with a dormancy behavior, and the second state is an active state with a non-dormancy behavior.

3. The method according to claim 2, wherein the first indication information comprises a first bitmap, each bit in the first bitmap corresponding to a group of Scells or an Scell and having a value indicating whether the state of the group of Scells or the Scell corresponding to the bit is the first state or the second state.

4. The method according to claim 1, wherein the second indication information is carried in a Physical Uplink Control Channel (PUCCH).

5. The method according to claim 1, wherein the second indication information further indicates the terminal device having successfully received the first indication information.

6. The method according to claim 1, further comprising:
   receiving, by the terminal device, first configuration information transmitted by the network device, the first configuration information being used to determine an Scell grouping configuration corresponding to the DCI in a first format and/or an Scell grouping configuration corresponding to the DCI in a second format.

7. The method according to claim 6, wherein
   the DCI in the first format is DCI corresponding to a WUS, and
   the DCI in the second format is DCI not corresponding to a WUS.

8. A feedback method, comprising:
   transmitting, by a network device, DCI to a terminal device, the DCI carrying first indication information indicating a state of at least one group of Scells or at least one Scell;
   receiving, by the network device, second indication information transmitted by the terminal device, the second indication information indicating that the terminal device acknowledges receipt of the first indication information; and transmitting, by the network device, second configuration information to the terminal device, the second configuration information being used to determine a first active BWP configuration corresponding to the DCI in the first format and a first active BWP configuration corresponding to the DCI in the second format.

9. The method according to claim 8, wherein the state is a first state or a second state;

the first state is an active state with a dormancy behavior, and the second state is an active state with a non-dormancy behavior.

10. The method according to claim 9, wherein the first indication information comprises a first bitmap, each bit in the first bitmap corresponding to a group of Scells or an Scell and having a value indicating whether the state of the group of Scells or the Scell corresponding to the bit is the first state or the second state.

11. The method according to claim 8, wherein the second indication information is carried in a PUCCH.

12. The method according to claim 8, wherein the second indication information further indicates the terminal device having successfully received the first indication information.

13. The method according to claim 8, further comprising:

transmitting, by the network device, first configuration information to the terminal device, the first configuration information being used to determine an Scell grouping configuration corresponding to the DCI in a first format and/or an Scell grouping configuration corresponding to the DCI in a second format.

14. The method according to claim 13, wherein the DCI in the first format is DCI corresponding to a WUS, and the DCI in the second format is DCI not corresponding to a WUS.

15. A terminal device, comprising:

a processor; and a memory having a computer program stored thereon, wherein the processor is configured to invoke and execute the computer program stored in the memory to perform a feedback method, the method comprising:

receiving Downlink Control Information (DCI) transmitted by a network device, the DCI carrying first indication information indicating a state of at least one group of secondary cells (Scells) or at least one Scell;

transmitting second indication information to the network device, the second indication information indicating that the terminal device acknowledges receipt of the first indication information; and receiving second configuration information transmitted by the network device, the second configuration information being used to determine a first active BWP configuration corresponding to the DCI in the first format and a first active BWP configuration corresponding to the DCI in the second format.

16. The terminal device according to claim 15, wherein the state is a first state or a second state; the first state is an active state with a dormancy behavior, and the second state is an active state with a non-dormancy behavior.

17. The terminal device according to claim 16, wherein the first indication information comprises a first bitmap, each bit in the first bitmap corresponding to a group of Scells or an Scell and having a value indicating whether the state of the group of Scells or the Scell corresponding to the bit is the first state or the second state.

18. A network device, comprising:

a processor; and a memory having a computer program stored thereon, wherein the processor is configured to invoke and execute the computer program stored in the memory to perform the method according to claim 9.

* * * * *